United States Patent
Newell

[15] 3,662,245
[45] May 9, 1972

[54] CONTROL CIRCUIT FOR ENERGIZING THE WINDINGS OF MULTI-PHASE STEP MOTORS INCLUDING A TWO LEVEL SUPPLY VOLTAGE

[72] Inventor: Harold R. Newell, South Newbury, N.H.

[73] Assignee: Mesur-Matic Electronics Corporation, Warner, N.H.

[22] Filed: Dec. 16, 1969

[21] Appl. No.: 885,552

[52] U.S. Cl. ............................................. 318/696, 318/442
[51] Int. Cl. ....................................................... H02k 37/00
[58] Field of Search ................... 318/138, 254, 696, 685, 442; 310/49

[56] References Cited

UNITED STATES PATENTS

| | | | |
|---|---|---|---|
| 3,402,334 | 9/1969 | Newton | 318/696 |
| 3,444,447 | 5/1969 | Newell | 318/696 |
| 3,445,741 | 5/1969 | Gerber | 318/696 |
| 3,452,263 | 6/1969 | Newell | 318/138 |
| 3,486,096 | 12/1969 | Van Cleave | 318/696 |
| 3,530,347 | 9/1970 | Newell | 318/138 |

*Primary Examiner*—G. R. Simmons
*Attorney*—Hurvitz & Rose

[57] ABSTRACT

A control circuit for multi-phase step motors includes a driven circuit responsive to timed incoming pulses to excite the motor phases according to a predetermined switching format. A power supply provides energization to the motor windings as the associated phases are excited, the energizing power normally supplied via a substantial dropping impedance. A network is provided in circuit with the dropping impedance to bypass that impedance and supply virtually the total power of the power supply to the windings associated with the excited motor phases, at selectable portions of the switching format.

12 Claims, 1 Drawing Figure

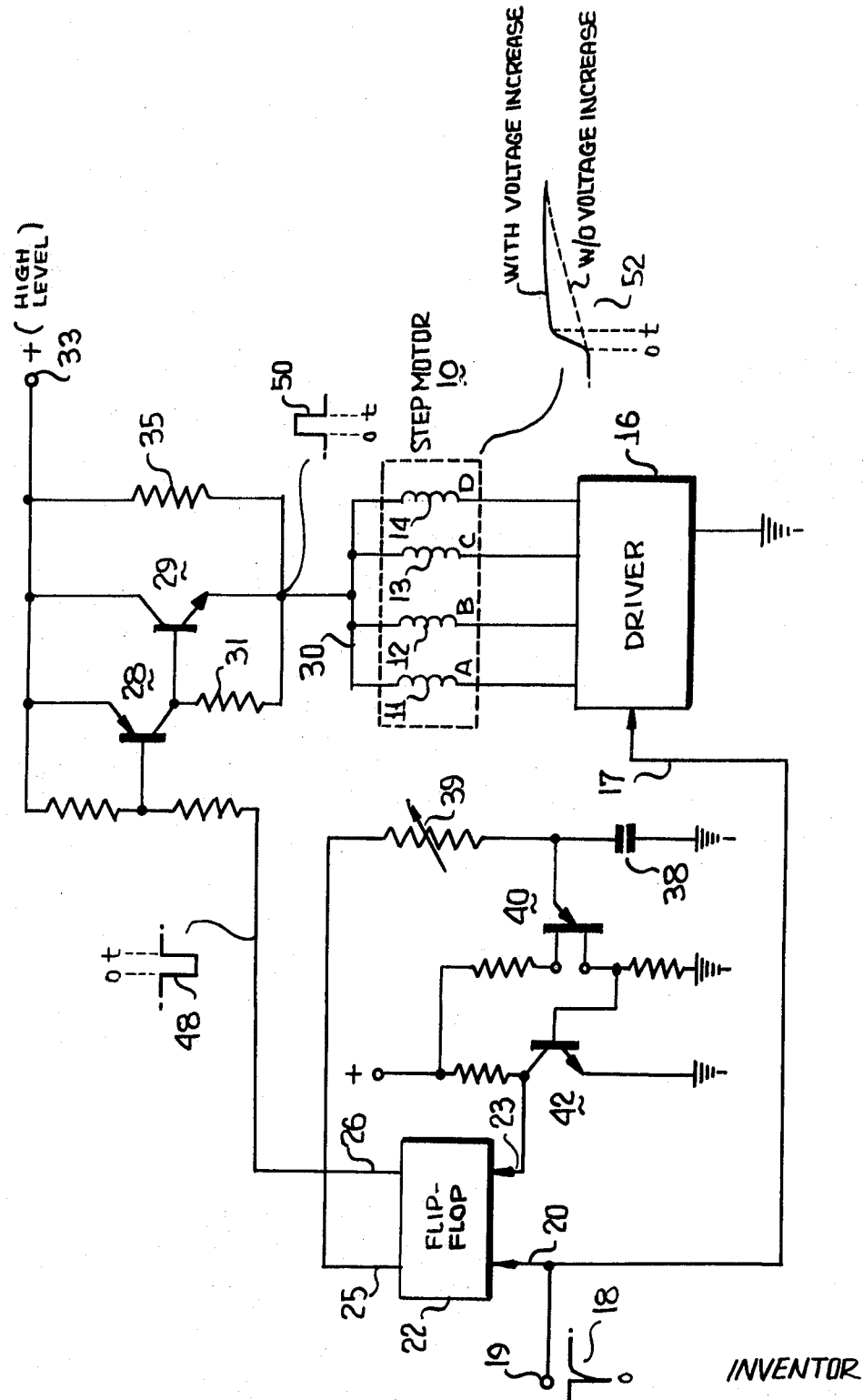

CONTROL CIRCUIT FOR ENERGIZING THE WINDINGS OF MULTI-PHASE STEP MOTORS INCLUDING A TWO LEVEL SUPPLY VOLTAGE

BACKGROUND OF THE INVENTION

The present invention is in the field of motor control circuits, and is particularly directed to control circuits for multi-phase step motors by which the normal energization of the windings is supplemented at selected phase switchings.

In my U. S. Pat. No. 3,444,447, entitled "Multi-Phase Step Motor Control Circuits Including Means for Supplementing the Normal Energization of the Windings", I disclose multi-phase driver circuitry in which plural switching circuits associated with respective phases (e.g., field windings) of a step motor are energized or activated according to a predetermined switching logic program so that each phase is "on" for a certain period, i.e., a time interval during which the corresponding field winding is excited, and is "off" for a certain period, i.e., a time interval during which the corresponding field winding is unexcited. Each switching circuit is constructed and arranged to store energy from the power supply for the overall network during the period its associated phase is "off" and to supply the stored energy along with the normally available energy from the power supply when the associated phase is turned "on", to compensate for the otherwise relatively slow increase in current (and voltage) level in the excited winding(s). This is especially advantageous when the step motor is operated at high switching speeds, because the driver provides a torque boost by enhancing the build-up of the torque-producing magnetic field as each winding is excited, and without need to vary the level of the power supply according to the speed at which the motor is operated. In effect, the driver circuit automatically adjusts motor driving torque throughout any variations in switching sped that may be required during motor operation.

In a somewhat different control circuit disclosed in my aforementioned patent, torque is maintained at a higher than normal level by taking advantage of the generation of a high voltage reverse polarity spike on a motor winding undergoing transition from the excited state to the unexcited state. According to the latter circuit embodiment, at the moment this reverse voltage surge exceeds a predetermined voltage level, and for the duration of time the surge exceeds that predetermined level, the entire supply voltage, rather than the normal fraction of the supply voltage which would otherwise be available, is applied directly across the next winding or windings switched "on" in the energization format.

SUMMARY OF THE INVENTION

The present invention is a variation of the torque boosting control circuit briefly discussed immediately above, in which the application of a supplemental voltage level to a phase (winding) as it is turned "on" is independent of any reverse voltage surge in a winding, and is selectively variable with respect to timing.

Briefly, according to the present invention there is provided a driver circuit for exciting the windings of a multi-phase step motor in a preselected switching format in which each winding is excited during certain preselected time increments and is devoid of excitation during certain other preselected increments of the switching formal. A power supply is connected in energizing circuit relation with the motor windings and the driver circuit, so that when the windings are excited by the driver circuit excitation current (voltage) is supplied via the power supply. An impedance is connected in the energizing circuit to normally reduce the power excitation level applied to the windings, and a bypass circuit is further connected in the energizing circuit to permit bypassing the impedance to supply substantially the entire power supply level to the excited winding(s). Means are provided for response to driver activation pulses to selectively energize the bypass circuit at desired points in the switching format.

BRIEF DESCRIPTION OF THE DRAWING

The sole FIGURE of drawing is a circuit diagram of a preferred embodiment of the control circuit for energizing the windings of the multi-phase step motor.

DESCRIPTION OF THE PREFERRED EMBODIMENT

Referring to the accompanying drawing, a step motor 10 is depicted as having four phases A, B, C, D associated with windings 11, 12, 13, 14, although a step motor having a greater number of phases might also take advantage of the principles of the present invention. Step motor 10 is driven by a conventional driver circuit 16 which responds to pulses applied to an input path 17 to excite one or more windings of the motor during intervals when one or more other windings are de-energized, according to a preselected switching format.

The input pulses 18 are to be applied to an input terminal 19 of the overall control circuit and thence in parallel to path 17 (and driver 16) and to an input path 20 of a flip-flop circuit 22. Flip-flop 22 has a pair of stable operating states, one of which is its normal quiescent state that is assumed by the flip-flop when a trigger pulse is applied to the reset input terminal or path 23 of the flip-flop. In the quiescent state, the voltage level appearing at output terminal 25 is "low" (for example, a near zero voltage level) while the voltage level at output terminal 26 is "high" (e.g., a positive polarity). Under these conditions, PNP transistor 28 is in a cutoff state (non-conducting), and hence a low voltage level or zero voltage appears across the base-emitter junction of NPN transistor 29 connected to the common lead 30 of motor 10 via resistance 31, so that the latter transistor is also in the cutoff state. The voltage existing at the common lead 30 of motor 10 is therefore the voltage at power supply terminal 33 less the voltage drop across dropping resistor or current limiting resistor 35 (assuming that one or more motor windings is connected to a point of reference potential, e.g., ground, via driver 16).

In the other state of flip-flop 22, assumed by the flip-flop when a trigger pulse is applied to set input terminal 20, output terminal 25 is switched to the "high" level and output terminal 26 is switched to the "low" level. Under those conditions, transistor 28 is switched to conduction, thereby raising the voltage level at the base electrode of transistor 29 to virtually the positive level at terminal 33, and the latter transistor accordingly also switches to the conductive condition. The voltage level existing at common lead 30 of the motor windings is then almost the entire positive level at power supply terminal 33.

Since terminal 25 of flip-flop 22 is at the "high" level, capacitor 38 is subjected to charging current via variable resistance 39. It is apparent, then, that the time constant of the charging circuit for capacitor 38 may be selected according to the voltage level at the high terminal of the flip-flop, the capacitance value of capacitor 38, and the resistance value of resistance 39. Since resistance 39 is variable, its value may be selectively adjusted to set the time constant of the charging network at any desired value. Depending upon the selected time constant, capacitor 38 will eventually be charged to a level equal to the peak point or "firing" voltage level of unijunction transistor 40, so long as the "high" voltage level continues to appear at flip-flop output terminal 25. At that point, the unijunction transistor (UJT) becomes highly conductive and a positive voltage appears at the normally grounded base electrode of that transistor, and thus at the base electrode of NPN transistor 42. The latter transistor is turned on, causing its collector to fall suddenly negative, triggering flip-flop 22 to the reset condition via reset input terminal 23.

In operation of the control circuit of the accompanying drawing, a train of pulses 18 is applied to network input terminal 19, and in parallel to set input terminal 20 of flip-flop 22 and to input path 17 of driver circuit 16. The driver thereby turns "off" one phase and turns "on" another phase, according to the sequential switching logic format that has been selected for driver operation. Simultaneously therewith, flip-flop 22 is triggered by the input pulse at terminal 20 from the quiescent or reset state to the set state, thereby switching transistors 28 and 29 to states of conduction and applying the full voltage level of the power supply at terminal 33 to the now energized winding(s) of the step motor.

Provided that the time constant of the charging circuit of capacitor 38 has been properly selected, the capacitor is rapidly charged to the firing level of UJT 40 and as the UJT is rendered conductive it also turns "on" transistor 42 to applying a reset trigger pulse to input terminal 23 of flip-flop 22. Accordingly, the flip-flop again assumes the quiescent state and the voltage across the excited motor windings(s) reverts to a level diminished by the voltage drop across limiting resistance 35.

For operation in which these events recur with each input pulse at terminal 19, representative voltage waveforms are shown at various points in the circuit. The turn-on pulse 48 at output terminal 26 of flip-flop 22 and which is applied to the base electrode of transistor 28, is initiated by an input pulse 18 and in turn initiates the high voltage pulse 50 at the motor common. When the flip-flop is reset, at time $t$, the pulse 48 terminates and in turn causes cessation of voltage supplementing pulse 50. The effect on the current level in the excited motor winding is shown in waveform 52. From time $o$ to time $t$ the current level in the winding builds up very rapidly to the desired operating level, in comparison to the normal rate of build-up (shown dotted in waveform 52).

This control circuit causes the current in the windings of the step motor to remain at relatively high level at high speed operation, by momentarily raising the voltage level across the excited motor winding(s) each time a phase switching occurs. The width of the high voltage pulse (50) is finite, and as the stepping rate is increased the time between the high voltage pulses is decreased. Hence, the average voltage level across the motor windings increases with increasing frequency, and tends to enhance the total current, and thus the torque.

It is not essential that the time constant of the charging circuit of capacitor 38 be set at a value which will result in repetition of the described operation with each incoming pulse. Instead, the time constant may be selected to result in charging of the capacitor to the peak point of UJT40 after a series of input pulses has been applied to terminal 19. At the conclusion of a preselected number of the input pulses (i.e., a "-block" of input pulses) the capacitor is charged to the peak point of the UJT, and the flip-flop reverts to the reset state. This is quite suitable for operation at a single high stepping rate, in which event the power supply level is appropriately selected to provide the proper current to the windings.

We claim:

1. A control circuit for exciting the windings of a multiphase step motor, said control circuit comprising a driver circuit for exciting said windings in a preselected switching format, so that each winding is excited during certain increments of said format and is de-energized during certain other increments of said format, a power supply, means coupling said power supply in circuit with said windings and with said driver circuit to supply a voltage to said windings upon excitation of said windings by said driver circuit in said preselected switching format, said means coupling including a common impedance means connected between said power supply means and all said windings for dropping the voltage which exists across the excited windings while said impedance means is in circuit, and further including switch means connected across said impedance means and effective when closed to bypass said impedance means so as to apply substantially the entire voltage of said power supply to said windings, and means concurrent with the pulses activating said driver circuit for applying square waves to transfer said switch means to its bypassing condition, and RC timing means for timing the durations of said square waves.

2. Control circuitry for exciting the field windings of a multiphase step motor, comprising a driver circuit for applying energizing current pulses to said field windings in a predetermined sequential switching format in response to sequential input pulses, means responsive to each of said input pulses operative concurrently with the initiation of each of said input pulses for adding a square shaped enhancing pulse of energizing current to the then energized one of said field windings, and a common RC timing circuit for completely terminating each of said enhancing pulses at a predetermined time following initiation of each of said enhancing pulses.

3. The combination according to claim 2, wherein is provided a bistable device normally in one state, means responsive to said bistable device in said one state for blocking said enhancing pulse and in another state for passing said enhancing state, means responsive to initiation of each input pulse for transferring said bistable device to said another state, and timing means responsive to attainment of said another state for transferring said bistable device to said one state following a predetermined time interval.

4. Control circuitry for a multiphase step motor, said step motor including plural field windings, a voltage supply, a voltage dropping resistance, a sequencing driver means for connecting said plural field windings sequentially to said voltage supply via said voltage dropping resistance, a source of repetitive pulses applied to control said sequencing driver, said sequencing driver being operative in response to each of said repetitive pulses for transferring energization of said field windings by said voltage supply from one to another of said field windings, a normally open switch connected across said voltage dropping resistance, and bistable means responsive solely to said repetitive pulses for transferring the state of said bistable device and for thereby closing said switch.

5. The combination according to claim 4, wherein is provided a timing circuit responsive to said repetitive pulses for resetting said bistable device and thereby opening said switch after a predetermined time interval from said closing.

6. The combination according to claim 4, wherein said last means includes a bistable device having first and second output terminals, said first output terminal being normally at one voltage and said second terminal being normally at another voltage for one stable condition of said bistable device, means connecting said second terminal in control relation to said switch, means responsive to each of said repetitive pulses tending to transfer the state of said bistable device and thereby change said another voltage to said one voltage and said one voltage to said another voltage and thereby close said switch, a timing circuit responsive to said repetitive pulses for resetting the state of said bistable device after a predetermined time interval from its transfer and thereby open said switch.

7. Control circuitry for exciting the field windings of a multiphase step motor, comprising a plurality of field windings of said step motor, a sequencing driver in cascade with said field windings, said sequencing driver being responsive to each of control pulses to effect each sequencing of said field windings, a power supply, a voltage dropping impedance connected in series with said field windings and said sequencing driver and said power supply, a switch connected across said voltage dropping impedance, a bistable device normally in one state and having connections to said switch for maintaining said switch non-conductive when said bistable device is in said one state and when in a second state rendering said switch conductive, means responsive to each of said control pulses tending to drive said bistable device into said second state, and timing means responsive to each transfer of state of said bistable device from said one to said another state for resetting said bistable device after a predetermined time interval.

8. In a step motor system, a step motor having plural stepping windings, a sequencer, a power supply, a source of spaced unidirectional control pulses, a voltage dropping resistance, means responsive to each of said control pulses for advancing said sequencer in accordance with a sequencing format to pass current from said power supply via said voltage dropping resistance to a different one of said stepping windings, an electronic switch connected across said voltage dropping resistance, a flip-flop connected to said electronic switch so as to maintain said electronic switch conductive in one state of said flip-flop and non-conductive in the alternate state, means responsive to each of said control pulses for driving said flip-flop into said one of said states, an integrator responsive to said flip-flop when in said alternative one of said states, and means responsive to said integrator when said integrator has achieved a predetermined integration level for resetting said flip-flop to said alternative state.

9. The combination according to claim 8, wherein said integrator is a series RC circuit having a predetermined time constant.

10. The combination according to claim 9, wherein said time constant is such that said predetermined integration level is achieved in the time between an adjacent pair of said control pulses.

11. The combination according to claim 9, wherein said time constant is such that said predetermined level is achieved in the time longer than the time between an adjacent pair of said control pulses.

12. The combination according to claim 9, wherein said series RC circuit includes a variable timing resistance.

* * * * *